July 15, 1969  S. U. LIEBER ETAL  3,456,115
WORKPIECE SUPPORT AND MASK ASSEMBLIES FOR RADIATION
BACKSCATTER MEASURING INSTRUMENTS
Filed Oct. 22, 1965  3 Sheets-Sheet 1
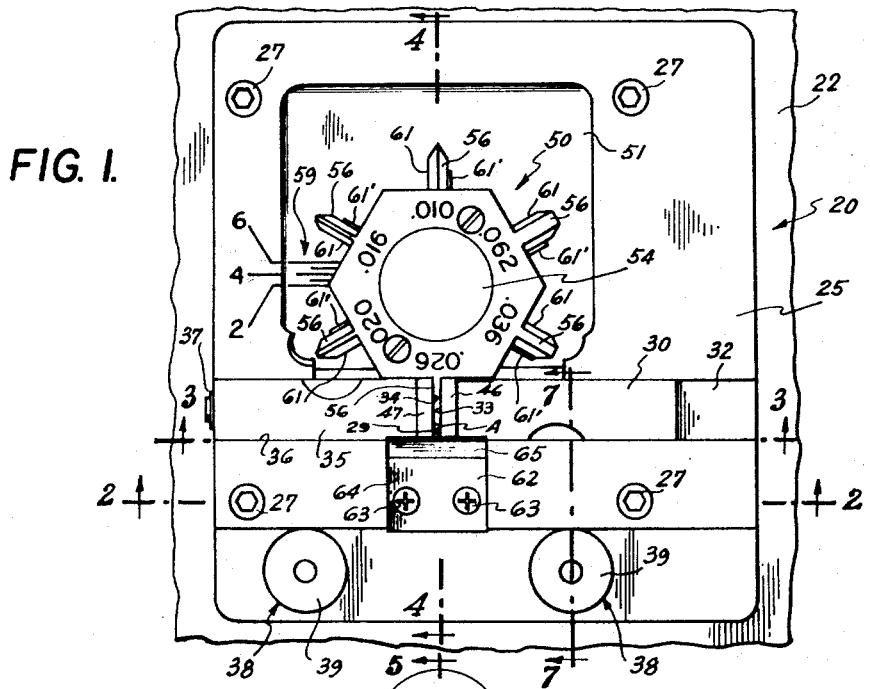
FIG. 1.
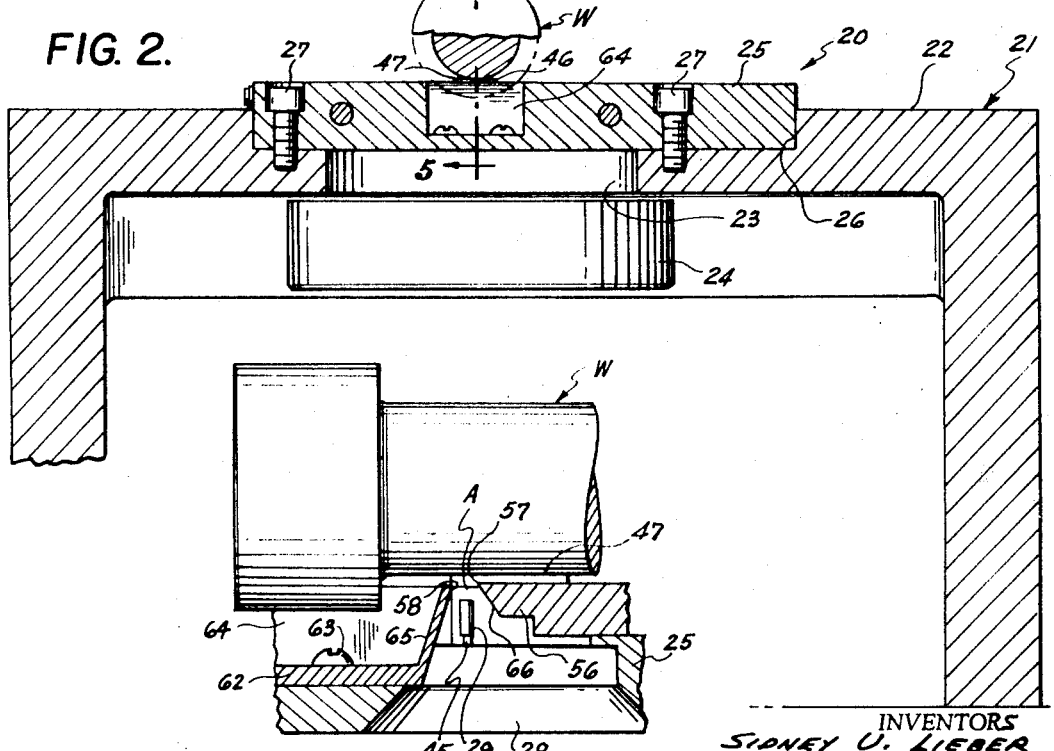
FIG. 2.
FIG. 5.
INVENTORS
SIDNEY U. LIEBER
AND WILLIAM D. KAY
BY
ATTORNEY

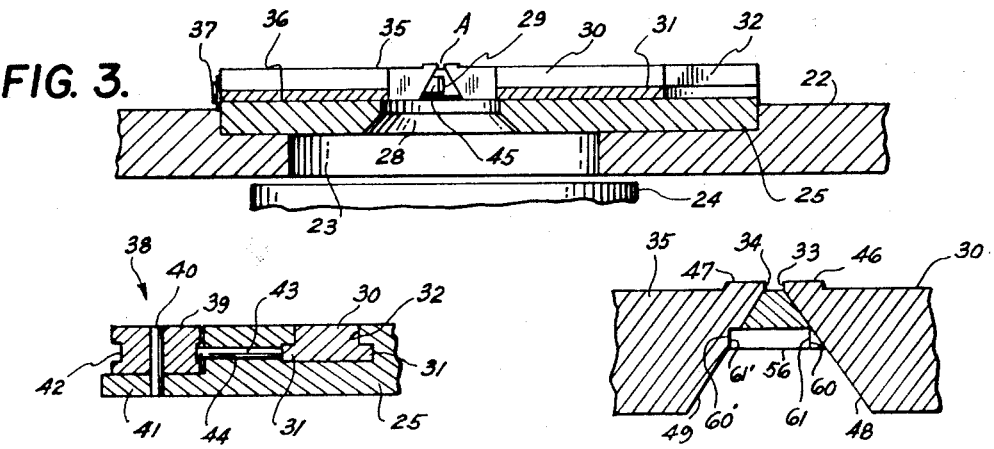
FIG. 3.
FIG. 7.  FIG. 6.
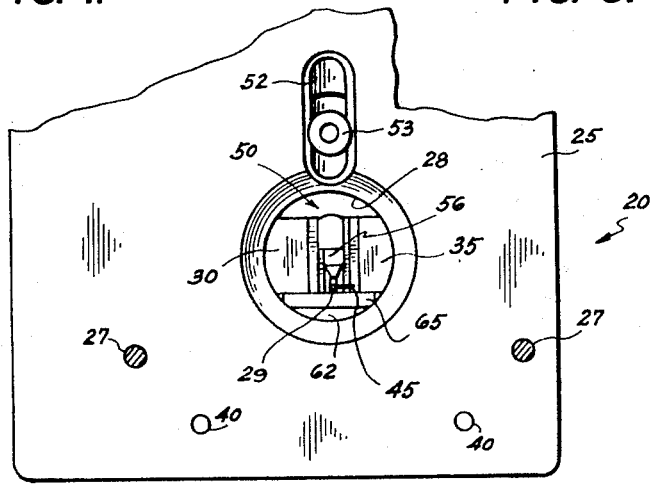
FIG. 8.
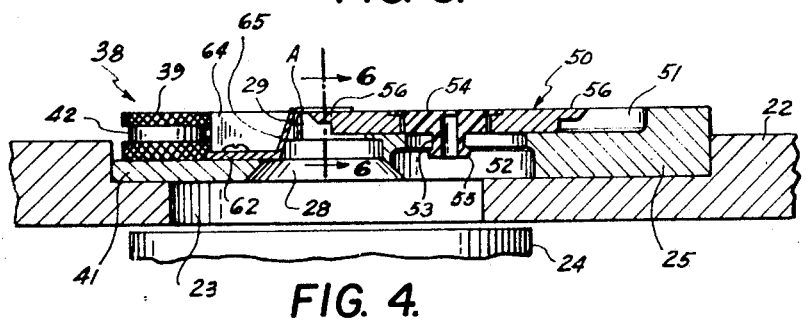
FIG. 4.

INVENTORS
SIDNEY U. LIEBER
AND WILLIAM D. HAY
BY

ATTORNEY

United States Patent Office 3,456,115
Patented July 15, 1969

3,456,115
WORKPIECE SUPPORT AND MASK ASSEMBLIES FOR RADIATION BACKSCATTER MEASURING INSTRUMENTS
Sidney U. Lieber, Bayside, and William D. Hay, Peekskill, N.Y., assignors to Unit Process Assemblies, Inc., Woodside, N.Y., a corporation of New York
Filed Oct. 22, 1965, Ser. No. 501,211
Int. Cl. G01t 1/18; G21f 5/02; H01j 35/16
U.S. Cl. 250—105                                   12 Claims

ABSTRACT OF THE DISCLOSURE

A workpiece support and mask assembly for a radiation backscatter type measuring instrument which includes at least two members selectively movable parallel to a support surface in directions substantially at right angles to each other so as to permit selective independent variation of the dimensions of a workpiece exposure and defining aperture in each of such directions.

---

This invention relates generally to instruments employing beta-radiation backscatter techniques for measuring the thicknesses of thin layers or coatings of one substance on a base material or substrate having a significantly different atomic number or for the sorting of different metals and alloys.

In instruments of the described type, radiation from a suitable beta-emitting isotope is directed against a surface of the workpiece or sample to be measured, and a detector, for example, a Geiger tube, picks up the backscatter, that is, the beta-radiation backscattered from the workpiece, and transmits corresponding signals to a suitable electronic system for interpretation and translation into readings on a meter. The intensity of the backscatter of the beta-rays is proportional to the atomic number of the material at the surface of the workpiece against which the radiation is directed. Where the workpiece has a coating substance of an atomic number different than that of the base material, the intensity of the backscattered radiation is further proportional to the thickness of the coating.

Comparison of the values obtained by the above procedure with the values from known standards leads to quantitative measured results. Thus, through such comparative measurement techniques, the meter readings can be calibrated either to indicate the material forming the workpiece or to indicate the thicknesses of various coating substances on various base materials. Beta ray backscatter measuring instruments have particularly found application in the measurement of the thicknesses of thin precious metal deposits and other coatings on electronic components such as, for example, transistor leads and headers, connectors, the reeds of reed relays, coatings on printed circuit boards, and tantalum on glass supports in resistors or resistance elements and the like.

It has long been recognized that higher degrees of accuracy are achieved in the measurement of the thickness of a coating substance on a base material or substrate by exposing maximal amounts of the surface area to be measured to radiation for backscatter therefrom to the detector. However, if, for example, adjacent uncoated surfaces of the base material are also exposed to such radiation, the backscatter from such exposed surfaces of the base material will affect the accuracy of the thickness measurement.

The need for delineation of the area exposed to radiation has been accentuated by the continuous trend to miniaturization, particularly in the electronic field, as evidenced by the continual diminution in size of the objects or workpieces mentioned above as illustrative typical subjects for beta backscatter type measurement. Because of such diminution of workpiece size and because of the selective location of coatings over areas of varying size and shape thereon and the presentation of areas of varying curvature or shape for measurement, maintenance of a readily available widespread field of potential use for such beta ray instruments has required the use of multiplicities of apertured plates or masks having exposure openings therein of varying sizes and shapes. Apart from the cost inherent therein and the nuisance of stacking large numbers of aperture plates and making comparative selection therefrom, the continual variations introduced in workpiece configuration presents a continual demand for new and complementally designed aperture plates with an accompanying additional expense and unavoidable delay time for the required fabrication thereof.

Accordingly, it is an object of this invention to provide a workpiece support and mask assembly for a beta radiation backscatter measuring instrument which defines an exposure opening or aperture of conveniently variable size and/or shape so that the instrument can be expeditiously used for measurements on workpieces of widely varying size and shape.

Another object is to provide a workpiece support and mask assembly defining an exposure opening of generally rectangular configuration which is conveniently variable both in width and length.

In accordance with the broad aspects of this invention, a workpiece support and mask assembly for a radiation backscatter measuring instrument comprises a plate, which may be effectively permanently attached to a support table, and means on the plate defining an exposure opening which opens through the plate and which includes at least two members selectively movable parallel to the plane of the plate in directions substantially at right angles to each other so as to independently vary the dimensions of the aperture in each of such directions.

The movable members defining the variable opening or aperture through the plate include a rectilinearly movable slide which, at one end, defines an edge of the aperture, and a wheel-like member having a plurality of spacer elements of different widths extending radially therefrom, the wheel-like member being mounted for rotation and for lineal movement toward and away from the path of movement of the slide so as to project a selected one of its radially extending spacer elements a variable distance between the end of the slide and the opposite edge of the aperture.

Another object of this invention is to provide a workpiece support and mask assembly defining an exposure opening, the size of which can be varied in at least two directions, and which has gauging means thereon for accurately setting and indicating the size of the opening.

A further object is to provide a workpiece support assembly of the described character which is adapted to permit the measurement of the coating thicknesses or analysis of the materials of workpieces having various configurations.

The above, and other objects, features and advantages of the invention, will be apparent in the following detailed description of illustrative embodiments thereof which is to be read in connection with the accompanying drawings, wherein:

FIG. 1 is a top plan view of a workpiece support and mask assembly for a radiation backscatter measuring instrument in accordance with one embodiment of this invention;

FIG. 2 is a transverse sectional view taken along the line 2—2 on FIG. 1, and showing the work support mounted in a work table;

FIG. 3 is a transverse sectional view taken along the line 3—3 on FIG. 1;

FIG. 4 is a sectional view taken at right angles to the view of FIG. 3 along the line 4—4 on FIG. 1;

FIG. 5 is an enlarged, fragmentary sectional view taken along the line 5—5 on FIG. 2;

FIG. 6 is an enlarged fragmentary sectional view taken along the line 6—6 on FIG. 4;

FIG. 7 is a fragmentary sectional view taken along the line 7—7 on FIG. 1;

FIG. 8 is a fragmentary bottom plan view of the work support on FIG. 1;

Figure 9:
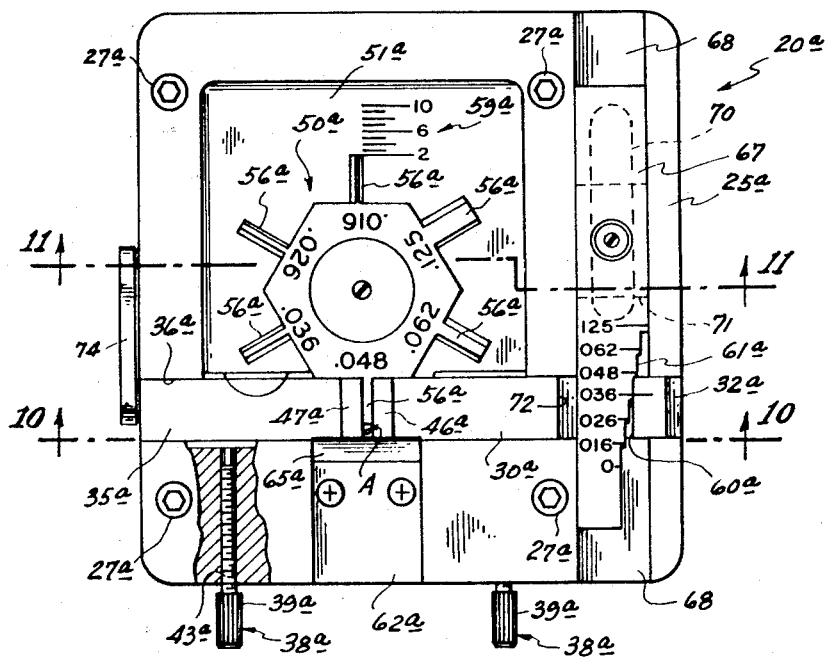
Figure 10:
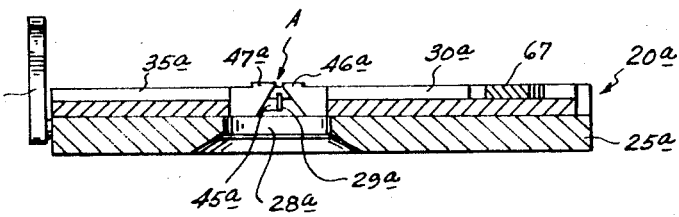
Figure 11:
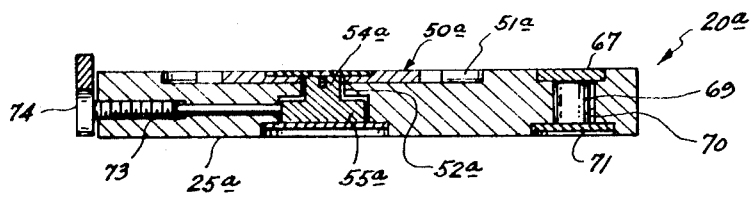

FIG. 9 is a top plan view of a workpiece support and mask assembly for a radiation backscatter measuring instrument in accordance with another embodiment of this invention, which is shown partly broken away; and FIGS. 10 and 11 are transverse sectional views respectively taken along the line 10—10 and the line 11—11 on FIG. 9.

Referring to the drawings in detail, and initially to FIGS. 1 and 2 thereof, it will be seen that a workpiece support and mask assembly 20 embodying this invention may be advantageously employed as part of a radiation backscatter measuring instrument of the type that includes a work table or platform 21 having a top 22 with an opening 23 therein below which a detector 24, for example, a Geiger tube of pancake configuration, is suitably mounted (FIG. 2).

The workpiece support assembly 20 embodying this invention comprises a plate 25 shaped to fit into a recess 26 formed in the upper surface of table top 22 around opening 23, and being securely attached to the table top, as by screws 27. Plate 25 has an opening 28 (FIGS. 3, 4 and 8) extending therethrough and which is located so as to be centered with respect to the table top opening 23 when plate 25 is secured in recess 26. Opening 28 may be circular and preferably has an undercut or beveled edge, as shown, so as to avoid interception of rays being reflected from a workpiece W (FIGS. 2 and 5) to the underlying detector 24.

In accordance with this invention, the workpiece support assembly 20 has means on its plate 25 defining an exposure opening A (FIGS. 1, 3, 4 and 5) located above plate opening 28 and being of variable size and/or shape so as to expose a suitable area of the workpiece W located above the opening A to radiation from a beta ray emitting isotope or other source contained in a source holder assembly 29 which is supported within the opening A, as particularly shown on FIG. 5. The means for defining the variable opening A includes a first member 30 movable parallel to the plane of plate 25 and which is shown in the form of a slide. Slide 30 is of dove-tail cross-section or has tongues 31 projecting from its opposite longitudinal edges (FIGS. 3 and 7) and is rectilinearly movable along a groove 32 of mating cross-section formed in the top surface of plate 25 and opening, at one end, at the periphery of opening 28. Thus, the inner end portion of slide 30 can be made to project a variable distance over opening 28 so as to similarly adjust the position of its inner end edge 33 which defines one edge of opening A.

In the workpiece support and mask assembly 20, the edge 34 of opening A which is opposed to edge 33 is defined by the inner end edge of a second slide 35 which is removably received in a groove 36 of mating cross-section formed in the upper surface of plate 25 in longitudinal alignment with groove 32. Slide 35 is normally held fixed in groove 36 and is longitudinally dimensioned so that, when a stop 37 (FIGS. 1 and 3) provided at the outer end of slide 35 engages the side edge surface of plate 25, the inner end portion of slide 35 will project from groove 36 a substantial distance over opening 28 to dispose its inner end edge 34 approximately above the center of opening 28. It will be apparent that, with slide 35 fixed in groove 36, rectilinear movement of slide 30 along groove 32 will serve to vary the distance across opening A between the opposed edges thereof defined by end edges 33 and 34 of slides 30 and 35.

Assembly 20 has a locking device 38 associated with each of the slides 30 and 35 for holding the latter at fixed positions within the related grooves 32 and 36. As shown particularly on FIG. 7, each of the locking devices 38 may include a knurled knob 39 rotatable on a pin 40 projecting from a relatively thin edge portion 41 of plate 25. Knob 39 has a groove 42 which is eccentric with respect to the axis of rotation of the knob and which receives the outer end of a locking pin 43. Each pin 43 is slidable axially in a bore 44 opening, at its opposite ends, above edge portion 41 and into the related groove 32 or 36. The pin 43 is longitudinally dimensioned so that, when knob 39 is turned to a position where the eccentricity of its groove 42 extends toward the slide 30 or 35, pin 43 is urged axially against the slide so as to lock the latter in its groove 32 or 36. However, when knob 39 is turned from the foregoing locking position, pin 43 releases the related slide 30 or 35 to permit longitudinal displacement of the latter within its guide groove.

The source holder assembly 29 which contains a radioactive isotope source of beta radiation preferably is supported within the defining bounds of opening A by one of the means defining such opening. As shown particularly on FIG. 3, the support for the source assembly 29 may be constituted by an arm 45 mounted on and projecting from the inner end of slide 35, preferably adjacent one side of the latter. The source assembly 29 is preferably cemented or otherwise permanently secured on the arm 45 of slide 35 so that, if it is desired to change the source of radiation, for example, when a different isotope is required, the slide 35 can be conveniently removed and replaced by a similar slide carrying a source assembly which contains the desired source of radiation. However, the source assembly can be removably mounted on the slide for selective source assembly replacement if desired.

The slides 30 and 35 further preferably have raised surfaces 46 and 47 (FIGS. 1, 2 and 6) extending along the edges 33 and 34 of opening A to engage and accurately locate the worpiece W with respect to the holder 29 containing the source of radiation. Further, as shown particularly on FIG. 6, the inner or confronting ends of slides 30 and 35 are preferably undercut or downwardly beveled, as at 48 and 49, so as to avoid interference with the reflection of beta rays from the surface of the workpiece exposed at opening A to the detector 24.

The workpiece support assembly 20 in accordance with this invention further comprises a wheel-like member 50 (FIGS. 1 and 4) which serves to vary the length of the opening A, that is, the dimension of the opening extending parallel to its edges 33 and 34. The wheel-like member 50 is disposed in a recess or depression 51 formed in the upper surface of plate 25 and opening, at one side, into the guide grooves 32 and 36. An elongated slot 52 (FIGS. 4 and 8) is formed in the bottom of recess 51 and extends at right angles to the longitudinal axes of slides 30 and 35. The slot 52 has its longitudinal axis on a line extending from the opening A and slidably receives a button 53 depending from a plastic hub 54 on which wheel-like member 50 is rotatably mounted. The button 53 has a rim or bead 55 (FIG. 4) at its lower end which is dimensioned to be forced downwardly through slot 52 and then to lie below the slot for maintaining the hub 54 in assembled relationship to the plate 25 while permitting movement of the axis of rotation of wheel-like member 50 along slot 52, that is, toward and away from the path of movement of slides 30 and 35.

As shown particularly on FIG. 1, wheel-like member 50 has a plurality of angularly spaced apart elements 56 extending radially therefrom for selective disposition between the confronting or inner ends of slides 30 and 35. The elements 56 have substantially trapezoidal cross-sections so as to fit closely between the beveled ends 48 and 49 of the slides, as shown on FIG. 6, and are of different widths so as to correspond to various selected spacings between the edges 33 and 34. Each element 56 has a length slightly less than that of the edges 33 and 34 of the slides so that, when an element 56 is projected to the fullest extent possible between edges 33 and 34, as on FIGS. 1 and 5, the opening A will have a predetermined minimum length or distance between the end edge 57 of the element 56 and the opposite end edge 58 of the opening. Further, the length of the slot 52 is substantially greater than the length of each of the elements 56 so that the hub 54 can be displaced in the direction away from slides 30 and 35 to an extent sufficient to withdraw the elements 56 completely from between the confronting ends of the slides and thereby permit turning of wheel-like member 50 when selecting the element 56 thereof to be employed for defining an end edge of the opening A.

As shown on FIG. 1, a scale 59 is provided on plate 25 within recess 51 to cooperate with wheel-like member 50 for indicating the distance between edges 57 and 58 of opening A for any of the possible adjusted positions of the axis of member 50 along slot 52. In the illustrated workpiece support assembly 20, the wheel-like member 50 is of hexagonal configuration and has six elements 56 extending normal to the six straight sides thereof. Thus, when any one of the elements 56 is extended between the confronting ends of slides 30 and 35 to define the end edge 57 of opening A, two opposed corners of the hexagonal member 50 will lie on a line perpendicular to the direction of displacement of the axis of member 50 along slot 52, and the scale 59 is disposed so that one of such corners will form the index movable along the scale for indicating the adjusted distance between edges 57 and 58 of the opening.

In accordance with this invention, the workpiece support and mask assembly has means engageable with the slide 30 to selectively limit the rectilinear movement thereof in the direction for decreasing the distance between the edges 33 and 34 at a plurality of positions corresponding to predetermined distances across the opening. In the workpiece support assembly 20 presently being described, such means for selectively limiting the movement of slide 30 at a plurality of positions is constituted by abutment surfaces 60 and 60' (FIG. 6) formed on the inner ends of slides 30 and 35 and by corresponding gauging surfaces 61 and 61' extending along opposite sides of each of the elements 56 for engagement with the abutment surfaces 60 and 60' when the related element 56 is extended between the confronting ends of slides 30 and 35. Thus, in the work support assembly 20, each element 56 of wheel-like member 50 performs the dual function of establishing a selected distance across opening A between the edges 33 and 34, and further of varying the length or distance between edges 57 and 58 of the opening.

In using the work support assembly 20, slide 35 is normally locked in the position where its stop 37 engages the side edge of plate 25. When the size of opening A is to be varied, the locking device 38 associated with slide 30 is loosened and slide 30 is backed away from the fixed slide 35 so as to permit withdrawal of wheel-like member 50 to a position where the same can be rotated. Member 50 is then turned to the position where the element 56 having a width corresponding to the desired width of the opening, as indicated by suitable indicia placed on member 50, extends in the direction toward the path of slide 30. Member 50 is then moved bodily to project the selected element 56 between edges 33 and 34 of the slides to the extent necessary for achieving the desired length of the opening, as indicated on the scale 59. Finally, slide 30 is moved toward slide 35 so as to tightly engage the desired element 56 therebetween, and the locking device 38 associated with slide 30 is again tightened to secure the slide 30 in its adjusted position. By reason of the tight engagement of the element 56 between slides 30 and 35, wheel-like member 50 is securely held in its adjusted position along slot 52.

As shown on FIGS. 1, 4 and 5, the means defining the opening A, and particularly the end edge 58 thereof, further includes a member 62 secured, as by screws 63, in a recess 64 formed in the upper surface of plate 25. Recess 64 is disposed at the side of slides 30 and 35 remote from wheel-like member 50 and opens into grooves 32 and 36. Member 62 has an upwardly directed vertical or inclined wall 65 which extends along the adjacent logitudinal edges of slides 30 and 35 and which defines the edge 58 of opening A. By reason of the existence of the recess 64 adjacent an end of the opening A, workpiece support and mask assembly 20 can be used in connection with workpieces having various configurations. Thus, as shown on FIG. 5, the workpiece W may be in the form of a stepped cylinder having a relatively small diameter portion thereof engaged by the raised surfaces 46 and 47 of slides 30 and 35 so that the thickness of a layer or coating on that portion may be measured, while a relatively larger diameter portion of the workpiece overhangs into the recess 64. Further, as shown on FIG. 5, the inclined disposition of wall 65 defining the end edge 58 of opening A, and the bevel 66 at the free end of each element 56 of member 50 ensure that such structures defining the end edges 57 and 58 of the opening A will only minimally, if at all, interfere with the passage of backscattered rays from the workpiece to the underlying detector.

It will be apparent from the above description of workpiece support assembly 20 that a workpiece W engaged and located by raised surfaces 46 and 47 may be exposed to radiation from the radioactive isotope in source holder assembly 29 at an area of variable size and shape selectively suitable for the particular workpiece to be measured, and that, in all instances, the workpiece is accurately located with respect to the radiation source and also with respect to the underlying detector. Further, it will be seen that the size and shape of the area of the workpiece exposed to radiation can be conveniently varied merely by manipulation of the slide 30 and the wheel-like member 50 without requiring the removal or replacement of any of the parts of work support 20.

Referring now to FIGS. 9, 10 and 11, it will be seen that a work piece support and mask assembly 20a in accordance with another embodiment of this invention, as there illustrated, is generally similar to the previously described work piece support assembly 20 and has its corresponding parts identified by the same reference numerals, but with the letter a appended thereto. The work piece support and mask assembly 20a differs substantially from the previously described support assembly 20 in that the elements 56a extending radially from the wheel-like member 50a are employed only for adjusting the length of the opening A, that is, the dimension of the opening extending at right angles to the path of movement of the slides 30a and 35a, whereas gauging of the adjusted positions of the slide 30a is effected by an additional gauging member 67. Such gauging member 67 is shown in the form of an elongated slide movable longitudinally in a groove 68 which extends at right angles to, and intersects the groove 32a. The groove 68 is of smaller depth than the groove 32a, and the gauging member 67 is retained in groove 68 by means of a pin 69 extending from gauging member 67 through an elongated slot 70 (FIGS. 9 and 11) and having a head 71 engaging the underside of plate 25a at the opposite sides of slot 70. Further, slide 30a has a recess or groove 72 extending laterally across its top surface so that gauging member 67 can project across slide 30a in such groove 72 of the latter. The groove 72 defines an abutment surface 60a at the wall or side surface of the groove closest to the outer end of slide 30a, and the gauging member 67 has one of its longitudinal edges stepped, and scale delineated, as at 61a, so that the several steps thereof define gauging surfaces that are selectively engageable with the abutment surface 60a.

The workpiece support and mask assembly 20a is further distinguished from the previously described embodiment of the invention in that its locking devices 38a for fixing the slides 30a and 35a in the respective grooves 32a and 36a are constituted by set screws 43a (FIG. 9). The screws 43a are threaded in tapped bores formed in the plate 25a and having knurled heads 39a which can be turned to advance the set screws 43a into locking engagement with the respective slides or to release the latter for longitudinal movement in their grooves.

In the work support assembly 20a the scale 59a is disposed within the recess 51a so that the index which cooperates with such scale to indicate the length of the opening A is constituted by the free end of the element 56a extending in the diametrically opposed direction with respect to the element 56a then positioned between the confronting ends of slides 30a and 35a.

Referring to FIG. 11, it will be seen that the hub 54a which rotatably carries the wheel-like member 50a is again slidable along an undercut slot 52a extending at right angles to the path of movement of slides 30a and 35a. Hub 54a is provided with a head 55a, at its bottom, for maintaining member 50a in assembled relation to plate 25a, and such head is elongated in the direction of slot 52a. In work support assembly 20a, a set screw 73 is threaded in a tapped bore opening into groove 52a and is engageable, at an inner end extension of the screw, with the head 55a at the bottom of hub 54a thereby to lock the hub at its adjusted position along slot 52a. A handle 74 is secured on the outer end of set screw 73 to permit manual locking and releasing of the set screw.

In using the workpiece support and mask assembly 20a, slide 35a is initially locked in its zero position relative to slide 30a and the wheel-like member 50a is turned to dispose the element 56a of the desired width, as indicated by the indicia thereon, between the confronting ends of slides 30a and 35a. Then the gauging member 67 is adjusted along its slot 68 until the gauging surface corresponding to the desired width of the opening A and forming one of the steps of the edge 61a is positioned for engagement with the abutment surface 60a on the slide 30a. The slide 30a is then pressed toward the slide 35a so as to achieve close contact of the abutment surface 60a with the selected gauging surface, thereby to ensure that the desired width of the opening A will be achieved, and slide 30a is then locked in such adjusted position by its respective locking device 38a. After slide 30a has been thus adjusted to achieve the desired width of opening A, wheel-like member 50a is adjusted along its slot 52a to provide the desired length of the opening A, and then set screw 73 is tightened against head 55a to lock member 50a in its adjusted position.

It will be apparent that, in each of the described embodiments of this invention, the length and width of the opening A may both be individually adjusted to provide an opening of selectively suitable size and shape for exposing the desired area of the workpiece to the beta radiation.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention, except as defined in the appended claims.

What is claimed is:

1. In a radiation backscatter measuring instrument, a workpiece support and mask assembly comprising
a plate having an opening therethrough,
means on said plate and displaceable into overlying relation with said opening for defining the effective dimensional extent thereof,
said means including a first workpiece supporting member lineally displaceable parallel to the plane of said plate in a first direction and
a second workpiece supporting member including a plurality of discrete spacing means each selectively alignable in a path substantially at right angles to said first direction and lineally displaceable parallel to the plane of said plate along said path in a second direction substantially at right angles to said first direction into abutting interfacial engagement with said first member,
whereby selective displacement of said first and second members in direction substantially at right angles to each other is effective to vary the dimensional extent of said opening in said first and second directions and thereby change the shape and size of the area of a workpiece to be exposed to radiation when said workpiece is disposed in supported overlying relation therewith.

2. In a radiation backscatter measuring instrument, a workpiece support and mask assembly according to claim 1; wherein said first member is in the form of a rectilinearly movable slide which, at one end, defines one edge of said opening so that movement of said slide varies the distance across said opening between said one edge and the opposite edge of the opening, and said second member is wheel-like and has elements of different widths extending radially therefrom, said wheel-like member being mounted for rotation in a plane parallel to said plate and for movement toward and away from the path of rectilinear movement of said slide so as to project a selected one of said elements a variable distance between said end of the slide and said opposite edge of the opening.

3. In a radiation backscatter measuring instrument, a workpiece support and mask assembly according to claim 2; further comprising means engageable with said slide to selectively limit the rectilinear movement thereof at a plurality of positions corresponding to predetermined distances across said opening.

4. In a radiation backscatter measuring instrument, a workpiece support and mask assembly according to claim 3; wherein said slide has an abutment surface thereon adjacent said end of the slide, and said means to limit the movement of the slide includes a gauging surface on each of said elements of the wheel-like member engageable with said abutment surface when the respective element is selected to project between said end of the slide and the opposite edge of the opening.

5. In a radiation backscatter measuring instrument, a workpiece support and mask assembly according to claim 3; wherein said slide has an abutment surface extending thereacross, and said means to limit the movement of the slide includes a gauging member mounted on said plate for movement at right angles to said slide and having a stepped edge defining a series of gauging surfaces selectively engageable with said abutment surface and corresponding to said plurality of positions of the slide.

6. In a radiation backscatter measuring instrument, a workpiece support and mask assembly according to claim 2; further comprising means for releasably locking said slide against rectilinear movement in any of said positions thereof.

7. In a radiation backscatter measuring instrument, a workpiece support and mask assembly according to claim 6; further comprising means for releasably locking said wheel-like member against said movement toward and away from said path of movement of the slide.

8. In a radiation backscatter measuring instrument, a workpiece support and mask assembly according to claim 2; wherein said means defining the opening has a recess of substantial depth adjacent the end of the opening remote from the selected element of said wheel-like member so as to permit a workpiece engaged by said support at edges of the opening to overhang into said recess.

9. In a radiation backscatter measuring instrument, a workpiece support and mask assembly comprising a plate having an opening therein and longitudinally aligned guide grooves extending in opposite directions from said opening in one surface of said plate, slides movable longitudinally in said guide grooves so as to variably project their confronting ends over said opening for defining opposed edges of an exposure aperture, recesses in said surface of the plate at opposite sides of said guide grooves and opening into the latter, a fixed member in one of said recesses having an end wall extending close to the adjacent side edges of said slides for defining one end of said aperture, the other of said recesses having a slot therein extending at right angles to said guide grooves, a wheel-like member having angularly spaced elements of different widths extending radially therefrom, and means rotatably supporting said wheel-like member within said other recess and being movable along said slot so that a selected one of said radial elements can be projected a variable distance between said confronting ends of the slides to define the other end of said aperture.

10. In a radiation backscatter measuring instrument, a workpiece support and mask assembly according to claim 9; further comprising stop means fixedly positioning one of said slides with respect to said plate, and means engageable with the other of said slides to selectively limit the movement thereof in the respective guide groove at a plurality of positions corresponding to predetermined distances between said edges of the aperture.

11. In a radiation backscatter measuring instrument, a workpiece support and mask assembly according to claim 10; wherein said slides have abutment surfaces thereon adjacent said confronting ends, and said means to limit the movement of said other slide includes gauging surfaces at opposed sides of each of said elements of the wheel-like member engageable with said abutment surfaces when the respective element is projected between said confronting ends of the slides.

12. In a radiation backscatter measuring instrument, a workpiece support and mask assembly according to claim 10; wherein said other slide has an abutment surface extending thereacross, and said means to limit the movement of said other slide includes a gauging member mounted on said plate for movement at right angles to the direction of movement of said other slide and having a stepped longitudinal edge defining a series of gauging surfaces selectively engageable with said abutment surface and corresponding to said plurality of positions of said other slide.

References Cited

UNITED STATES PATENTS

| 2,474,422 | 6/1949 | Hollstein | 250—105 |
| 2,964,631 | 12/1960 | Foster | 250—83.3 |

RALPH G. NILSON, Primary Examiner

A. L. BIRCH, Assistant Examiner

U.S. Cl. X.R.

250—83.3, 106